United States Patent [19]

Coleman, III et al.

[11] Patent Number: 4,659,685
[45] Date of Patent: Apr. 21, 1987

[54] HETEROGENEOUS ORGANOMETALLIC CATALYSTS CONTAINING A SUPPORTED TITANIUM COMPOUND AND AT LEAST ONE OTHER SUPPORTED ORGANOMETALLIC COMPOUND

[75] Inventors: William M. Coleman, III, Lake Jackson, Tex.; Gregory F. Schmidt, Midland, Mich.; Richard E. Campbell, Jr., Midland, Mich.; Mark S. Delaney, Midland, Mich.

[73] Assignee: The Dow Chemical Company, Midland, Mich.

[21] Appl. No.: 840,165

[22] Filed: Mar. 17, 1986

[51] Int. Cl.$^4$ .............................................. C08F 4/64
[52] U.S. Cl. .................................... 502/113; 502/102; 502/103; 502/117; 526/114; 526/115; 526/116; 526/125
[58] Field of Search ................ 502/102, 103, 113, 117

[56] References Cited

U.S. PATENT DOCUMENTS

| 3,135,809 | 6/1964 | Bosmajian | 502/103 X |
|---|---|---|---|
| 4,107,415 | 8/1978 | Giannini et al. | 502/123 X |
| 4,285,834 | 8/1981 | Lowery et al. | 502/113 |
| 4,404,344 | 9/1983 | Sinn et al. | 502/103 X |
| 4,487,845 | 12/1984 | Triplett | 502/113 X |
| 4,544,762 | 10/1985 | Kaminsky et al. | 556/179 |

FOREIGN PATENT DOCUMENTS

| 824858 | 7/1982 | South Africa . |
| 838140 | 11/1983 | South Africa . |

OTHER PUBLICATIONS

Rideal, *Concepts in Catalysis*, Pub. by Academic Press, N.Y., N.Y., (1968), p. 5.

"Bis(Cyclopentadienyl)Zirconium Compounds and Aluminoxane as Ziegler Catalysts for Polymerization and Copolymerization of Olefins", by Walter Kaminsky, Mssoud Miri, Hansjorg Sinn and Rudiger Woldt, *Makromol. Chem., Rapid Commun.*, vol. 4, pp. 417–421 (1983).

"Polymerization and Copolymerization with a Highly Active, Soluble Ziegler–Natta Catalyst", by Walter Kaminsky, edited by R. P. Quirk, MMI Press, Symposium Series, vol 4, Harwood Academic Publishers, pp. 225–244 (1983).

"Influence of Hydrogen on the polymerization of Ethylene with the Homogeneous Ziegler System Bis(Cyclopentadienyl)Zirconium Dichloride/Aluminoxane", by Walter Kaminsky and Hartmut Luker, *Makromol. Chem.*, Rapid Commun., vol. 5, pp. 225–228 (1984).

"Catalytic Olefin Polymerization", *Catalysis, Science and Technology*, by I. Pasquon and U. Giannini, Edited by J. R. Anderson and M. Boudart, vol. 6, 1984, pp. 65–159.

"Ziegler–Natta Catalysis", *Advanced in Organometallic Chemistry*, by H. Sinn and W. Kaminsky, vol. 18, Academic Press, New York, 1980, pp. 99–149.

"Ethylene Propylene Diene Terpolymers Produced with a Homogeneous and Highly Active Zirconium Catalyst", *J. Polymer Sci., Poly. Chem. Ed.*, W. Kaminsky and M. Miri, vol. 23, No. 8, pp. 2151–2164, 1985.

*Primary Examiner*—Patrick P. Garvin

[57] ABSTRACT

Catalyst compositions are disclosed which are a combination of a supported titanium compound such as titanium tetraisopropoxide supported on magnesium dichloride and at least one other supported metallic catalyst such as dicyclopentadienyl zirconium dichloride supported on alumina and a cocatalyst such as aluminoxane. These catalysts are useful in the polymerization of α-olefins.

8 Claims, No Drawings

HETEROGENEOUS ORGANOMETALLIC CATALYSTS CONTAINING A SUPPORTED TITANIUM COMPOUND AND AT LEAST ONE OTHER SUPPORTED ORGANOMETALLIC COMPOUND

BACKGROUND OF THE INVENTION

The present invention concerns catalyst compositions for polymerizing olefins which comprises a combination of at least one supported titanium-containing catalyst and at least one other separately supported organometallic catalyst and the polymerization of olefins therewith.

Kaminsky et al have shown in *Makromol. Chem., Rapid Commun.,* Vol. 4, pp. 417–421 that a homogeneous halide-free catalyst system consisting of bis(cyclopentadienyl) titanium compounds and bis(cyclopentadienyl) zirconium compounds with polymethylaluminoxane derivatives as cocatalysts are highly active for polymerizing ethylene at temperatures below 100° C. At temperatures above 100° C., low molecular weight polymers are produced.

It has now been discovered that these complexes plus similar complexes of Sc, V, Cr, Mn, Fe, Co, Ni, Cu, Zn, Y, Nb, Mo, Ce, Pr, Nd, Th, Pa and U can be employed in conjunction with titanium based catalysts to yield polymers having broader molecular weight distributions and are multimodal, i.e. the polymers have at least two different molecular weight distributions appearing as two well resolved peaks in the gel permeation chromatograms.

SUMMARY OF THE INVENTION

The present invention pertains to catalyst compositions which comprise a mixture of a supported titanium compound and at least one other separately supported or non-supported organometallic compound wherein the metal portion of the metallic compound is selected from Sc, V, Cr, Mn, Fe, Co, Ni, Cu, Zn, Y, Zr, Nb, Mo, Ce, Pr, Nd, Th, Pa and U.

The present invention also pertains to a process for polymerizing olefins which comprises polymerizing one or more α-olefins or one or more α-olefins and one or more polymerizable ethylenically unsaturated monomers in the presence of the aforementioned catalyst composition and a suitable cocatalyst.

DETAILED DESCRIPTION OF THE INVENTION

Suitable titanium compounds which can be employed herein include, for example, those represented by the formula $TiR'_x X'_{4-x}$ wherein each R' is independently a hydrocarbyl or hydrocarbyloxy group having from about 1 to about 20, preferably from about 3 to about 10 carbon atoms, X' is a halogen, preferably chlorine or bromine and x has a value from 1 to 4. Also suitable are those titanium compounds disclosed by Coleman, III et al in U.S. Pat. Nos. 4,528,339 and 4,525,556 which are incorporated herein by reference.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Particularly suitable titanium compounds include, for example, titanium tetrachloride, titanium tetrabromide, tetramethoxy titanium, tetraethoxy titanium, tetraisopropoxy titanium, tetra 2-ethylhexoxy titanium, di-n-butoxy titanium dichloride, mixtures thereof and the like.

Suitable organometallic compounds other than titanium which can be employed herein include those represented by the formula

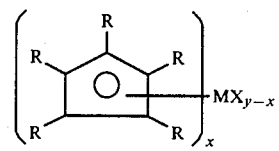

wherein M is selected from the group consisting of Sc, V, Cr, Mn, Fe, Co, Ni, Cu, Zn, Y, Zr, Nb, Mo, Ce, Pr, Nd, Th, Pa or U; each R is independently hydrogen or a hydrocarbyl group having from 1 to about 10, preferably from 1 to about 5, most preferably from 1 to about 2 carbon atoms and where two of such R groups can be joined so as to form multiring compounds; each X is independently hydrogen, a hydrocarbyl or a hydrocarbyloxy group having from 1 to about 20, preferably from 1 to about 10, most preferably from 1 to about 5 carbon atoms, or a halogen, preferably chlorine or bromine; x has a value from 1 to the valence of M minus one and y has a value equal to the valence of M.

Particularly suitable organometallic compounds other than titanium compounds include, for example, bis(cyclopentadienyl)zirconium dimethyl, bis(cyclopentadienyl)zirconium dichloride, bis(pentamethylcyclopentadienyl)zirconium dimethyl, bis(pentamethylcyclopentadienyl)zirconium dichloride, bis(cyclopentadienyl)uranium dimethyl, bis(cyclopentadienyl)uranium dichloride, bis(pentamethylcyclopentadienyl)uranium dimethyl, bis(pentamethylcyclopentadienyl)uranium dichloride, bis(indenyl)zirconium dimethyl, bis(indenyl)zirconium dichloride, mixtures thereof and the like.

Any inert inorganic material which has an average particle size of from about 0.0001 to about 1000, preferably from about 0.001 to about 100 microns and a surface area of at least about 10 to about 1000, preferably from about 50 to about 500 m$^2$/g can be employed. Particularly suitable inorganic support materials include, for example, silica, alumina, silica.alumina cogels, silica.magnesium oxide cogels and magnesium dichloride.

The titanium compounds and the other metallic compounds and the inorganic support material are employed in amounts which provide an atomic ratio of the inorganic support material to titanium or the other metal of from about 1:1 to about 1000:1, preferably from about 2:1 to about 500:1, most preferably from about 5:1 to about 100:1.

Suitable cocatalysts which can be employed herein include, for example, those aluminum compounds represented by the formulas $AlR'_{3-a}X_a$ and

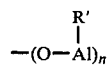

wherein R' is a hydrocarbyl group having from 1 to about 10 carbon atoms; each X is chlorine or bromine; a has a value of from 1 to 3 and n has a value from 1 to about 100, preferably from 1 to about 20. Particularly suitable catalysts include, for example, triethylaluminum, diethylaluminum chloride, ethylaluminum dichloride, ethylaluminum sesquichloride, hexaisobutylaluminoxane, tetraisobutylaluminoxane, polymethylaluminoxane, tri-n-octylaluminum, mixtures thereof and the like.

The supported titanium compounds can be prepared by combining a magnesium halide hydrocarbon slurry with an alkyl aluminum halide and aging for at least 4 hours (14,400 s) at a temperature of from about zero to about 100° C. followed by reaction with a titanium compound to a temperature of from about 0° C. to about 100° C. for at least about 8 hours (28,800 s).

The organometallic compounds other than the supported titanium compounds can be prepared by allowing a solution of the compound to contact a hydrocarbon slurry of the support, when employed, with stirring for a minimum of about 8 hours (28,800 s) at a temperature of from about 0° C. to about 100° C. under dry, inert conditions.

Suitable supports for the organometallic compounds other than the supported titanium compounds include, for example, magnesium halide, alumina, alumina cogels, silica, silica cogels, mixtures thereof and the like. The cogels usually consist of a predominant portion of the named inorganic oxide and minor portions of other inorganic oxides such as silica, alumina, magnesia and the like.

Mixing of the catalyst components is preferably carried out in the presence of inert diluents such as, for example, aliphatic or aromatic hydrocarbons such as, for example, liquified ethane, propane, butane, isobutane, n-butane, n-hexane, the various isomeric hexanes, isooctane, paraffinic mixtures; of alkanes having from 8 to 12 carbon atoms, cyclohexane, methylcyclopentane, dimethylcyclohexane, dodecane, 2,2,4-trimethylpentane, benzene, toluene, ethylbenzene, cumene, dacalin industrial solvents composed of saturated or aromatic hydrocarbons such as kerosene, naphthas, combinations thereof and the like.

Suitable α-olefins which can be polymerized with the catalyst of the present invention include, for example, those having from 2 to about 20 carbon atoms, preferably those having from 2 to about 10 carbon atoms such as, for example, ethylene, propylene, butylene, pentene-1, 4-methyl-1-pentene, hexene-1, heptene-1, octene-1, nonene-1, decene-1, mixtures thereof and the like. Also, if desired, other polymerizable ethylenically unsaturated monomers can be employed in addition to the α-olefin(s) such as, for example, ethylenically unsaturated carboxylic acids, esters of ethylenically unsaturated acids, organic nitriles, aromatic compounds, unsaturated organic halides, mixtures thereof and the like. Particularly suitable such monomers include, for example, acrylic acid, methacrylic acid, methyl acrylate, methyl methacrylate, ethyl acrylate, ethyl methacrylate, 2-ethylhexyl acrylate, 2-ethylhexyl methacrylate, hydroxyethyl acrylate, hydroxyethyl methacrylate, acrylonitrile, methacrylonitrile, styrene, chloromethyl styrene, α-methyl styrene, vinyl chloride, vinylidene chloride, mixtures thereof and the like.

In the polymerization process employing the catalyst of the present invention, polymerization is effected by adding a catalytic amount of the catalyst composition to a polymerization zone containing the monomer(s) to be polymerized or vice versa. Any polymerization method can be employed including slurry, solution gas phase, high pressure process and the like. The polymerization zone is usually maintained at temperatures in the range from about 0° C. to about 300° C., preferably at solution polymerization temperatures, e.g., from about 130° C. to about 250° C., for a residence time of about a few seconds to several days, preferably 15 seconds to 2 hours (7200 s). It is generally desirable to carry out the polymerization in the absence of moisture and oxygen and a catalytic amount of the catalytic reaction product is generally within the range of from about 0.0001 to about 0.1 millimoles of active metal per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of active metal. Generally, in the polymerization process, a carrier which may be an inert organic diluent or solvent or excess monomer is employed. In order to realize the full benefit of the catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture. It is understood that inert diluents employed in the polymerization recipe are suitable as defined hereinbefore.

The polymerization pressures preferably employed are relatively low, e.g., from about 5 to about 10,000 psig (0.034–68.9 MPa), preferably from about 50 to about 1000 psig (0.345–6.89 MPa), most preferably from about 100 to about 700 psig (0.689–4.8 MPa). However, polymerization within the scope of the present invention can occur at pressures from atmospheric up to pressures determined by the capabilities of the polymerization equipment, which can include pressures up to about 50,000 psig (344.5 MPa). During polymerization it is desirable to stir the polymerization recipe to obtain better temperature control and to maintain uniform polymerization mixtures throughout the polymerization zone.

In order to optimize catalyst yields in the polymerization of ethylene under solution conditions, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented. In other processes, it is preferred to conduct the polymerization in an excess of the α-olefin being polymerized in order to optimize catalyst yields.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer(s) to the polymerization vessel, but during or before the addition of the catalyst. The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any, of the latter is present, in order to remove the heat of reaction. In any event, adequate means should be provided for dissipating the exothermic heat of polymerization. If desired, the monomer can be brought in the vapor phase into contact with the catalyst, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixtures, through an equilibrium overflow reactor or a series of the same.

The polymer is readily recovered from the polymerization mixture by driving off unreacted monomer(s) and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventially employed for deactivating Ziegler catalysts. The resultant polymer is found to contain insignificant amounts of catalyst residue and to posses a relatively broad molecular weight distribution.

The following examples are given to illustrate the invention, and should not be construed as limiting its scope. All percentages are by weight and all parts are by molar or atomic ratio unless otherwise indicated.

In the following examples, the melt index values, $I_2$ and $I_{10}$ were determined by ASTM D 1238-70, the density values were determined by ASTM D 1248 and the GPC measurements were conducted on a Waters Model 150 gel permeation chromatograph.

The following components and procedures were employed in the examples.

Component A was a toluene solution of bis(n$^5$-pentamethylcyclopentadienyl)dimethyl uranium ((n$^5$-(CH$_3$)$_5$Cp)$_2$UMe$_2$) prepared as described in *Journ. Am. Chem. Soc.*, Vol. 107, p. 641, 1985.

Component B was a toluene solution of dicyclopentadienyl dimethyl zirconium (Cp$_2$Zr.Me$_2$) prepared as described in Journ. Am. Chem. Soc., Vol. 107, p. 641, 1985.

Component C was a toluene solution of dicyclopentadienyl zirconium dichloride (Cp$_2$Zr.Cl$_2$) purchased from Strem Chemicals of Newburyport, Mass.

Component D was a toluene solution of bis(n$^5$-pentamethylcyclopentadienyl)zirconium dichloride ((n$^5$-(CH$_3$)$_5$Cp)$_2$ZrCl$_2$) purchased from Strem Chemicals of Newburyport, Mass.

Component E was polymethylaluminoxane prepared as described in Hoechst Patents Nos. DT OLS 3,240,382 and 3,240,383 (May 3, 1984) with a slight modification. The modification was toluene used as solvent and the reaction was allowed to proceed for 4 days.

Component F was prepared as follows. To 50 ml of 0.2M MgCl$_2$ in ISOPAR ® E in a 4 oz. (118 ml) bottle under a nitrogen atmosphere was added 2 ml of 25% ethylaluminum dichloride in hexane. Stirring was continued for a minimum of 8 hours (28,800 s) at 20° C. after which time 0.225 ml of neat tetraisopropoxytitanium was added. Stirring was continued for an additional 8 hours (28,800 s) minimum at 20° C. The atomic ratio for this catalyst was 40 Mg/104 Cl/12 Al/3 Ti. For polymerizations an amount of this catalyst necessary to give the desired amount of Ti was injected into the reactor along with an amount of Component G.

Component G was triethylaluminum purchased from Ethyl Corporation as a 25% solution in hexane.

Component H was SiO$_2$ purchased from W. R. Grace Co., Davison Chemicals Div. as Davison 952. It was treated at 800° C. to remove water prior to use.

Component I was aluminum trioxide purchased from Degussa as Aluminum Oxid C. It was treated at 800° C. to remove water prior to use.

Component J was prepared as follows. To 50 ml of 0.2M MgCl$_2$ in ISOPAR ® E was added 0.055 ml of neat TiCl$_4$. Stirring was continued for a minimum of 8 hours (28,800 s) at 20° C. Then 0.14 grams of 1,1'-bi-2-naphthol was added as a solid followed by stirring for an additional 8 hours (28,800 s) at 20° C. The Mg/Ti atomic ratio was 40/1. An amount of this slurry necessary to yield the desired amount of Ti was injected into the reactor along with an amount of Component G.

Component K was prepared by adding Component C to a toluene suspension of Component H to give the desired ratio.

Component L was prepared by adding Component B to a toluene suspension of Component I to give the desired ratio.

Component M was prepared by adding Component C to a toluene suspension of Component I to give the desired ratio.

Component N was prepared as follows. To 50 ml of 0.1M n-Bu-sec-Bu magnesium solution in dry toluene was added HCl gas at a temperature of 20° C. until the Mg/Cl ratio was ½.

Component O was prepared by adding Component D to a toluene suspension of Component N to give the desired ratio.

POLYMERIZATION PROCEDURE

To a one gallon (3.785 l) batch reactor set at 150° C. and charged with 2 l of ISOPAR ® E, 300 ml of 1-octene and pressurized with ethylene to 380 psig (2620 kPa) was added an amount of organometallic component dissolved in toluene and aluminum as polymethylaluminoxane (PMA) dissolved in toluene. After 10 minutes (600 s) an amount of the titanium component and an amount of Component G to yield the desired ratio were added to the reactor and polymerization was allowed to proceed for an additional 10 minutes (600 s). After this time, the polymer was removed, dried under reduced pressure and weighed to determine the yield.

The catalyst components employed and the results obtained ar given in the following Table.

TABLE

| Example # or Comparative Example Letter | Titanium Component TYPE | Titanium Component Amount in Micromoles | Ti Cocatalyst Component TYPE | Ti Cocatalyst Component Al/Ti Ratio | Organometallic Component TYPE | Organometallic Component Amount in Micromoles | Organometallic Cocatalyst Component Type | Organometallic Cocatalyst Component Al/Metal Ratio | Molecular Weight Distribution $M_w M_n$ | $H_2$ psig (kPa) | Melt Flow Index $I_2$ | Molecular Weight Distribution $I_{10}/I_2$ | g PE from Organometallic / g PE from Ti source |
|---|---|---|---|---|---|---|---|---|---|---|---|---|---|
| A | — | — | — | — | A | 8 | E | 4000/1 | 3.65 | 0 (0) | — | — | — |
| 1 | F | 9 | G | 3/1 | A | 8 | E | 4000/1 | 50.80 | 100 (670) | — | — | 75/50 |
| 2 | F | 9 | G | 3/1 | A | 8 | E | 4000/1 | 40.3 | 100 (670) | — | — | 50/50 |
| 3 | F | 9 | G | 3/1 | A | 8 | E | 4000/1 | 49.5 | 0 | — | — | 50/50 |
| B | — | — | — | — | B | 6 | E | 3248/1 | 5.84 | 0 | — | — | — |
| 4 | F | 9 | G | 3/1 | B | 8 | E | 640/1 | 29.2 | 0 | — | — | 24/50 |
| 5 | F | 9 | G | 3/1 | B | 8 | E | 640/1 | 16.8 | 200 (1379) | — | — | 26/50 |
| C | — | — | — | — | B | 8 | E | 640/1 | 11.1 | 200 (1379) | — | — | 26 Zr/50 U |
| 6 | F | 9 | G | 3/1 | B | 8 | E | 640/1 | 47.10 | 200 (1379) | — | — | 25 Zr/25 U/50 Ti |
| D | F | 9 | G | 3/1 | — | — | — | — | 3.95 | 200 (1379) | 21.0 | 7.42 | — |
| E | — | — | — | — | K | 10 | E | 640/1 | 7.95 | 0 | 17.22 | 7.59 | — |
| 7 | F | 9 | G | 3/1 | K | 10 | E | 640/1 | 17.8 | 0 | .24 | 7.25 | 27/76 |
| F | — | — | — | — | L | 48 | E | 640/1 | 7.03 | 0 | 31.01 | 7.95 | — |
| 8 | F | 3.15 | G | 3/1 | L | 48 | E | 640/1 | 11.2 | 0 | 1.42 | 12.03 | 38/65 |
| G | — | — | — | — | M | 48 | E | 640/1 | 6.6 | 0 | 27.7 | 7.87 | — |
| 9 | F | 3.15 | G | 3/1 | M | 48 | E | 640/1 | 9.85 | 0 | .654 | 15.34 | 35/44 |
| 10 | J | 3.0 | G | 3/1 | K | 10 | E | 640/1 | 58.7 | 0 | .009 | 24.4 | 22/56 |
| H | J | 3.0 | G | 3/1 | — | — | — | — | 24.5 | 0 | .005 | 13.8 | — |
| I | — | — | — | — | O | 20 | E | 640/1 | 11.9 | 0 | 25.66 | 10.29 | — |
| 11 | F | 3.15 | G | 3/1 | O | 20 | E | 640/1 | 21.8 | 0 | 0.20 | 12.6 | 20/76 |

We claim:

1. A catalyst composition which comprises (1) at least one titanium compound represented by the formula TiR'$_x$X'$_{4-x}$ wherein each R' is independently a hydrocarbyl or hydrocarbyloxy group having from about 1 to about 20 carbon atoms; X' is a halogen and x has a value from 1 to 4 supported on an inert inorganic support material and (2) at least one organometallic compound represented by the following formula

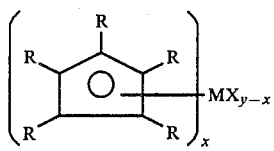

wherein M is selected from the group consisting of Sc, V, Cr, Mn, Fe, Co, Ni, Cu, Zn, Y, Zr, Nb, Mo, Ce, Pr, Nd, Th, Pa or U; each R is independently hydrogen or a hydrocarbyl group having from 1 to about 10 carbon atoms; each X is independently hydrogen, a hydrocarbyl or a hydrocarbyloxy group having from 1 to about 20 carbon atoms, or a halogen, and wherein two of such R groups can be joined so as to form a multiring compound; x has a value from 1 to the valence of M minus one and y has a value equal to the valence of M; and wherein component (2) is either non-supported or is supported on an inert inorganic support material.

2. A catalyst of claim 1 wherein
(i) in component (1), each R' is independently a hydrocarbyl or hydrocarbyloxy group having from 1 to about 5 carbon atoms; and each X' is chlorine or bromine; and
(ii) in component (2), each R is independently hydrogen or a hydrocarbyl group having from 1 to about 5 carbon atoms and each X is independently hydrogen, chlorine, bromine or a hydrocarbyl group having from 1 to about 10 carbon atoms.

3. A catalyst of claim 2 wherein in component (2), M is Zr or U; each R is independently hydrogen or a hydrocarbyl group having from 1 to about 2 carbon atoms; each X is independently hydrogen, chlorine, bromine or a hydrocarbyl group having from 1 to about 5 carbon atoms and x has a value of 2.

4. A catalyst of claim 3 wherein
(i) said titanium compound is tetraisopropoxy titanium, titanium tetrachloride, (1,1'-bi-2-naphtholate)titanium dichloride or a combination thereof; and
(ii) the organometallic compound is bis(cyclopentadienyl)uranium dimethyl, bis(cyclopentadienyl)uranium dichloride, bis(pentamethylcyclopentadienyl)uranium dimethyl, bis(pentamethylcyclopentadienyl)uranium dichloride, bis(cyclopentadienyl)zirconium dimethyl, bis(cyclopentadienyl)zirconium dichloride, bis(pentamethylcyclopentadienyl)zirconium dimethyl, bis(pentamethylcyclopentadienyl)zirconium dichloride or a combination thereof.

5. A catalyst of claim 1 wherein the titanium compound is supported on magnesium dichloride and the organometallic compound is supported on alumina, silica, silica.alumina cogels, silica.magnesium oxide cogels or magnesium chloride.

6. A catalyst of claim 2 wherein the titanium compound is supported on magnesium dichloride and the organometallic compound is supported on alumina, silica, silica.alumina cogels, silica.magnesium oxide cogels or magnesium chloride.

7. A catalyst of claim 3 wherein the titanium compound is supported on magnesium dichloride and the organometallic compound is supported on alumina, silica, silica.alumina cogels, silica.magnesium oxide cogels or magnesium chloride.

8. A catalyst of claim 4 wherein the titanium compound is supported on magnesium dichloride and the organometallic compound is supported on alumina, silica, silica.alumina cogels, silica.magnesium oxide cogels or magnesium chloride.

* * * * *